United States Patent [19]

Maruyama et al.

[11] Patent Number: 4,661,730
[45] Date of Patent: Apr. 28, 1987

[54] LINEAR PULSE MOTOR

[75] Inventors: Toshiki Maruyama; Hiroshi Nakagawa; Minoru Maeda, all of Ise, Japan

[73] Assignee: Shinko Electric Co., Ltd, Tokyo, Japan

[21] Appl. No.: 717,081

[22] Filed: Mar. 28, 1985

[30] Foreign Application Priority Data

Mar. 28, 1984 [JP] Japan ................... 59-60364
May 15, 1984 [JP] Japan ................... 59-97346
May 15, 1984 [JP] Japan ................... 59-97347

[51] Int. Cl.⁴ .......................................... H02K 41/00
[52] U.S. Cl. ........................................ 310/12; 318/135
[58] Field of Search ........................... 310/12-14; 318/135

[56] References Cited

U.S. PATENT DOCUMENTS

| | | | |
|---|---|---|---|
| 3,656,014 | 4/1972 | Kich | 310/13 |
| 4,370,577 | 1/1983 | Wakabayashi et al. | 310/12 |
| 4,504,750 | 3/1985 | Onodera et al. | 318/135 X |
| 4,535,260 | 8/1985 | Pritchard et al. | 318/135 X |
| 4,563,602 | 1/1986 | Nagasaka | 310/12 |
| 4,578,622 | 3/1986 | Nakagawa et al. | 310/12 X |
| 4,581,553 | 4/1986 | Moczala | 318/135 X |
| 4,594,520 | 6/1986 | Miwa et al. | 318/135 X |

FOREIGN PATENT DOCUMENTS 1316131 5/1973 United Kingdom ............... 310/72

Primary Examiner—Donovan F. Duggan
Attorney, Agent, or Firm—Kane, Dalsimer, Sullivan & Kurucz

[57] ABSTRACT

A linear pulse motor which includes: a primary magnetic flux generating unit composed of a pair of cores each having a coil wound therearound and a plurality of magnetic poles provided at end portions thereof; and a scale having a row of first teeth formed therein along a direction of relative travel thereof with respect to the magnetic flux generating unit, the scale and the flux generating unit being disposed so that the scale relatively moves with respect to the primary magnetic flux generating unit by generating magnetic flux between gaps formed between the magnetic poles and the teeth facing to the magnetic poles. The magnetic flux generating unit includes a spacer through which the cores are jointed in a parallel manner. Each core has a pair of arms and a substantially U shape, the core being provided on each end of the arms thereof with the magnetic pole. The magnetic flux generating unit is disposed with respect to the scale so that the cores are placed in one of both a direction parallel to and a direction perpendicular to the row of teeth.

5 Claims, 8 Drawing Figures

LINEAR PULSE MOTOR

BACKGROUND OF THE INVENTION

The present invention relates to a structure of a magnetic circuit in a linear pulse motor.

The linear pulse motor stepwisely propels and positions a forcer, which may be either a scale or a magnetic flux generating unit, in accordance with pulse signals supplied to the unit. A typical example of the permanent magnet-type linear pulse motor is diagrammatically illustrated in FIG. 1, in which reference numeral 1 designates an elongated plate scale as a stator in the upper face of which are longitudinally formed a row of teeth 1a, 1a, ... with a predetermined pitch. Above the scale 1 there is disposed a magnetic flux generating unit 7 as a forcer to be movable along the scale 1 by a suitable supporting means (not shown), the unit including a permanent magnet 6 and a pair of U-shaped cores 4 and 5 each having a coil 2 or 3 wound around them and magnetically interconnected through the magnet 6 in a serial manner with polarity of the magnet 6 as shown in FIG. 1. Magnetic poles 4a and 4b of the core 4 and magnetic poles 5a and 5b of the core 5 are shifted ½ of the pitch of the teeth 1a of the scale 1 with respect to the teeth and the cores 4 and 5 are disposed with a shift of ¼ of the pitch.

The magnetic circuit of this prior art linear pulse motor has a structure such that both the magnetic flux of generated by the coils 2 and 3 and the magnetic flux of the permanent magnet 6 longitudinally pass through the scale 1 and hence the permanent magnet 6 and cores 4 and 5 must be serially arranged along the direction of travel of the forcer 7. Thus this motor is disadvantageous in that the forcer is long in the direction of the travel thereof.

A flat-type linear pulse motor was proposed in U.S. patent application Ser. No. 543,927 (filed: Oct. 20, 1983), now U.S. Pat. No. 4,578,622 corresponding to Japanese Patent Application No. 57-198,658, of which disclosure is hereby incorporated by reference. One embodiment disclosed in this patent application is illustrated in FIG. 2, in which 10 and 11 are U-shaped core units having coils 12 and 13 wounded around them, respectively. These core units 10 and 11 are horizontally disposed so that magnetic poles 10a and 10b and magnetic poles 11a and 11b are opposed to each other, respectively, and the core units are bonded through adhesive to a permanent magnet 16. In the upper surface of each of the poles 10a, 10b, 11a and 11b, a comb-shaped tooth portion 10a', 10b', 11a' or 11b' is formed. An attaching plate 17 is bonded to the lower face of the permanent magnet 16. The forcer 18 thus constructed has a guide passage defined by guide members 14 and 15 and the magnetic poles 10a, 10b, 11a and 11b and a plurality of balls 19, 19, ... are rotatably retained on the lateral peripheries of the guide passage. The scale 1 is placed above the magnetic poles 10a, 10b, 11a and 11b by resting the lateral peripheries of the scale 1 on the balls 19, so that the scale 1 is longitudinally propelled and positioned by supplying a predetermined number of pulse signals to the coils 12 and 13. This liner pulse motor considerably satisfies requirement in reduction in volume, but it is disadvantageous in that the magnetic flux generating unit 18 is long in the longitudinal direction of the scale 1 and in that the magnetic path through which magnetic flux generated from the coils 12 and 13 is long and wide, so that flux leakage is large, resulting in relatively large power consumption.

SUMMARY OF THE INVENTION

Accordingly, it is an object of the present invention to provide a linear pulse motor in which the magnetic flux generating unit is reduced in length in the direction of relative travel thereof.

It is another object of the present invention to provide a linear pulse motor in which flux leakage is relatively small in the flux generating unit, thus reducing necessary ampere-turn and power consumption.

With these and other objects in view, the present invention provides a linear pulse motor which includes: a primary magnetic flux generating unit composed of a pair of cores each having a coil wound therearound and a plurality of magnetic poles provided at end portions thereof; and a scale having a row of first teeth formed therein along a direction of relative travel thereof with respect to the magnetic flux generating unit, the scale and the flux generating unit being disposed so that the scale relatively moves with respect to the primary magnetic flux generating unit by generating magnetic flux between gaps formed between the magnetic poles and the teeth facing to the magnetic poles. The magnetic flux generating unit includes a spacer through which the cores are jointed in a parallel manner. Each core has a pair of arms and a substantially U shape, the core being provided on each end of the arms thereof with the magnetic pole. The magnetic flux generating unit is disposed with respect to the scale so that the cores are placed in one of both a direction parallel to and a direction perpendicular to the row of teeth.

DETAILED DESCRIPTION OF THE PREFERRED EMBODIMENTS

Figure 1:
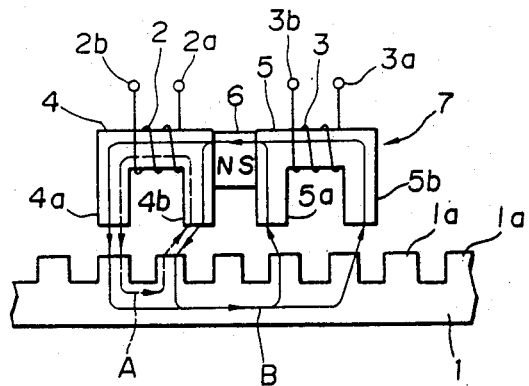
FIG. 1 is a diagrammatical side view of a typical example of the prior art linear pulse motor.
Figure 3:
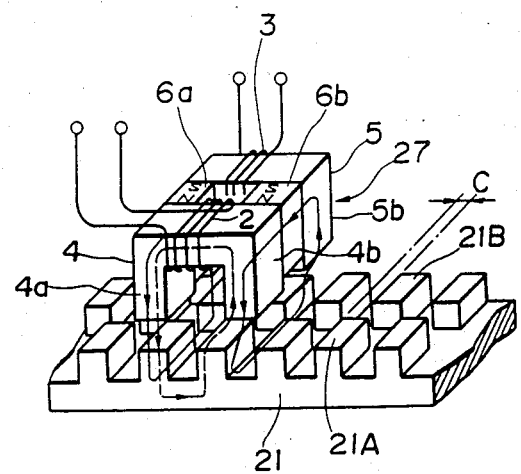
FIG. 3 is a diagrammatical perspective view of one embodiment of the present invention.

Referring now to the drawings, FIG. 3 illustrates a linear pulse motor in which similar parts corresponding to those shown in FIG.1 designated by like reference characters and further explanations thereof are omitted. A scale 21 has two parallel rows of teeth 21A and 21B formed in one surface thereof with a constant pitch. Teeth 21A and 21B are shifted ¼ of the pitch (C) thereof to each other. The cores 4 and 5 are bonded in a parallel and symmetrical manner through adhesive such as epoxy resin to a pair of parallel permanent magnets 6A and 6B to form a slider 27 as a magnetic flux producing means. The slider 27 is disposed above the scale 21 so that the cores 4 and 5 are parallel to the longitudinal direction of the scale 21 and the pole faces of the magnetic poles 4A and 4B may face top faces or lands of the teeth 21A and the pole faces of the magnetic poles 5A and 5B lands of the teeth 21B. The polarity of the permanent magnets 6A and 6B are shown in FIG. 3 and the magnets are disposed perpendicular to the longitudinal direction of the scale 21. With such construction, the magnetic fluxes generated from the permanent magnets 6A and 6B pass through the scale 21 in a direction perpendicular to the longitudinal direction of the scale 21, that is, in the crosswise direction of the scale 21.

With such a construction, predetermined pulse signals are supplied to the coils 2 and 3 so that the magnetic poles 4a, 4b 5a and 5b have magnetically stable points successively at positions shifted ¼ of the pitch from the teeth 21A and 21B, thus propelling the forcer 27 in increments of ¼ of the pitch along the rows of the teeth.

Figure 4:
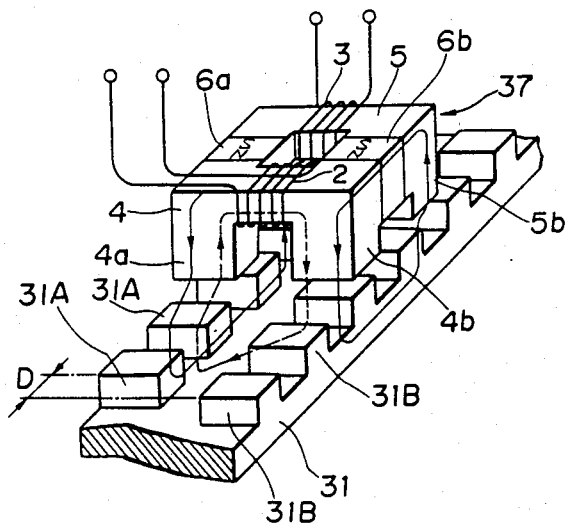
FIG. 4 is a diagrammatical perspective view of another embodiment of the present invention.

Referring to FIG. 4 there is illustrated another embodiment of the present invention, which is distinct from the previously-described embodiment in that the cores 4 and 5 are disposed in the crosswise direction of the scale 31 and the permanent magnets 6A and 6B in the longitudinal direction of the scale 31. A further distinction is that teeth 31A of one row are shifted ½ of the pitch D with respect to teeth 31B of the other row. With such a construction, magnetic fluxes generated from the coils 2 and 3 crosswisely pass the scale 31, and magnetic fluxes from the permanent magnets 6A and 6B longitudinally pass the scale 31.

Since in the above-described two embodiments, the cores 4 and 5 are disposed in a parallel manner, the magnetic flux generating units 27 and 37 become small in length in the direction of travel thereof as compared to the prior art sliders 7 and 18, and the magnetic path from the magnetic pole 5A through the magnet 6A to the magnetic pole 4A and the magnetic path from the magnetic pole 5B through the magnet 6B to the magnetic pole 4B are equal in length, causing the amount of flux from each of the permanent magnets 6A and 6B through corresponding magnetic pole to be made equal to thereby reduce difference in propelling force from them.

In a modified form of the sliders 27 and 37, the pole pieces 4A and 4B of the core 4 may be shifted a predetermined value of the pitch of the teeth with respect to those of the core 5 instead of shifting the teeth of one row with respect to the teeth of the other row.

Figure 5:
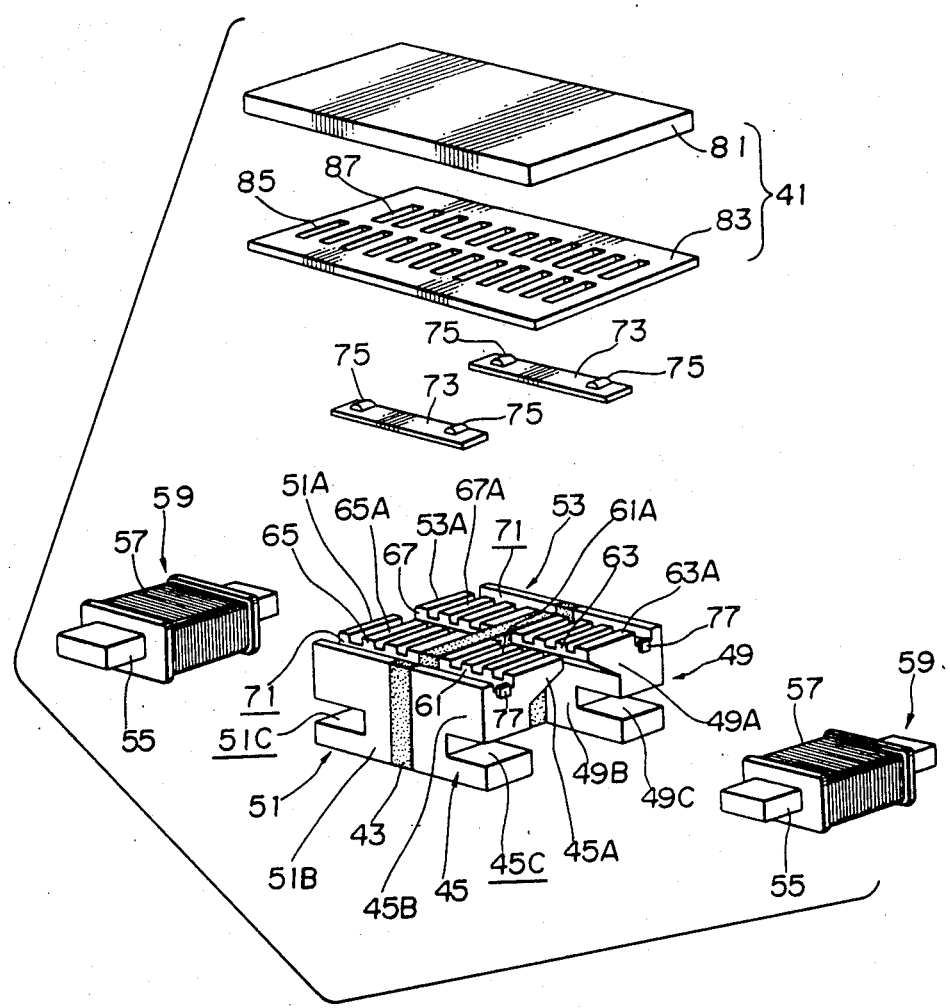
FIG. 5 is an exploded view of still another embodiment of the present invention.
Figure 6:
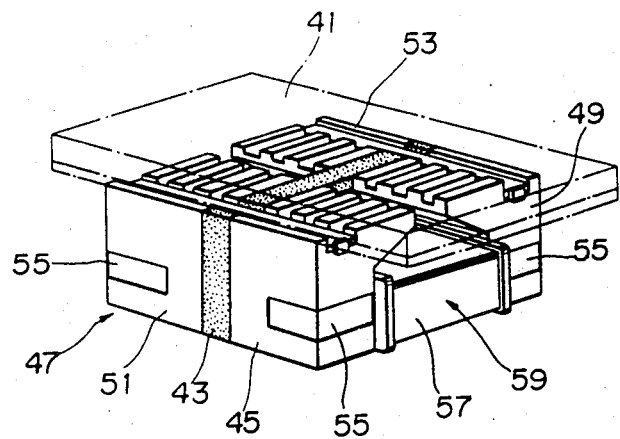
FIG. 6 is an enlarged perspective view of the completed linear pulse motor of FIG. 5, in which the scale is indicated by the phantom line for interest of clarity.

Referring to FIGS. 5 and 6, there is shown another embodiment of the present invention, in which reference numeral 47 indicates a magnetic flux generating unit. The unit 47 includes a rectilinear permanent magnet 43 to one face of which is bonded a pair of generally L-shaped yoke members 45 and 49 so that end faces of shorter arms 45A and 49A of the two yoke members face to each other in an upside-down manner and to the opposite face of which is bonded another pair of generally L-shaped yoke member 51 and 53 so that end faces of shorter arms 51A and 53A of the two yoke members face to each other in an upside-down manner. The upper faces of the shorter arms of the yoke member 45, 49, 51 and 53 are placed to be flush with the upper edge of the permanent magnet 43. Longer arms 45B, 49B, 51B, only three of which are shown, of the yoke members 45, 49, 51 and 53 have each a horizontal receiving notch 45C, 49C, 51C formed therein to extend toward the magnet 43. A pair of magnets 59 and 59 are each received in a space defined by inner faces of corresponding pair of yoke members 45, 49 or 51, 53 as shown in FIG. 6. Each magnet 59 has a plate core 55 and a coil 57 wound around the core and is attached to the corresponding yoke members 45, 49 or 51, 53 by fitting the opposite end portions of the core thereof into corresponding notches of the yoke members. The yoke members 45, 49, 51 and 53 are each provided in their upper faces with a row of teeth 61, 63, 65 and 67, four teeth in this embodiment, with a predetermined pitch, respectively. These teeth are formed to be parallel with the upper edge of the permanent magnet 43 and lands of the teeth constitute pole faces 61A, 63A, 65A and 67A. The teeth 61, 65 are shifted ¼ of the pitch with respect to the teeth 63 and 67. The magnetic flux generating unit 47 is provided in each lateral periphery of the upper face thereof with a guide groove 71 parallel to the rows of the teeth 61, 63, 65 and 67, that is, perpendicular to the longitudinal direction of the permanent magnet 43. A carriage 73 having a pair of rollers 75 and 75 rotatably supported thereon is received in each groove 71 to be movable along the groove by rolling the rollers 75 and 75 on the bottom of the groove. At the opposite ends of each guide groove 71 there is each provided a retainer 77 although only two retainers are shown in FIGS. 5 and 6. An elongated rectilinear scale 41 having a base plate 81 and a slit plate 83 bonded to the base plate 81 is disposed above the magnetic flux generating unit 47. The scale 41 is movably supported by resting lateral peripheries of the lower face of the slit plate 83 on the rollers 75 of the carriages 73 and is guided by a guide member (not shown) to be movable along the rows of teeth 61, 63, 65 and 67. The slit plate 83 has two parallel rows of equispaced slits 85 and 87 longitudinally formed through the center portion thereof and is placed over the magnetic flux generating unit 47 so that the two rows of teeth 61, 65 and 63, 67 may face the rows of slits 85 and 87 respectively. Slits 85 of one row are formed to be shifted ½ of pitch with respect to slits 87 of the other row. The slits 85 and 87 are formed to be parallel to the teeth 61, 63, 65 and 67.

Figure 2:
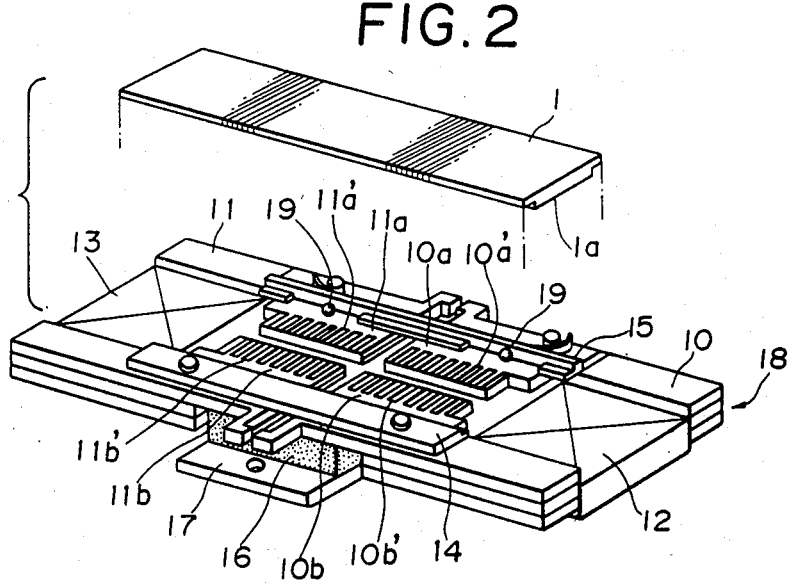
FIG. 2 is a perspective view of another linear pulse motor.

With such a construction, the scale 41 is longitudinally propelled and positioned over the flux generating unit 47, which is fixed to a base (not shown), by supplying predetermined number of pulse signals to the coils 57 as in the prior art linear pulse motor shown in FIG. 2.

Alternatively, the flux generating unit 47 may be moved instead of the scale 41 is moved.

In the embodiment in FIGS. 5 and 6, cores 55 each having a coil 57 previously wound around them are fitted into the corresponding receiving notches of the yoke members 45, 49, 51 and 53, and thereby fabrication of the pulse motor is facilitated.

Figure 8:
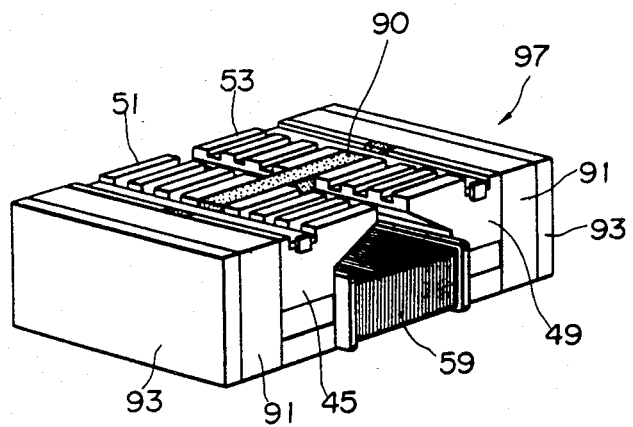
FIG. 8 is an enlarged perspective view of the completed linear pulse motor of FIG. 7, in which the scale is omitted for the sake of clarity.
Figure 7:
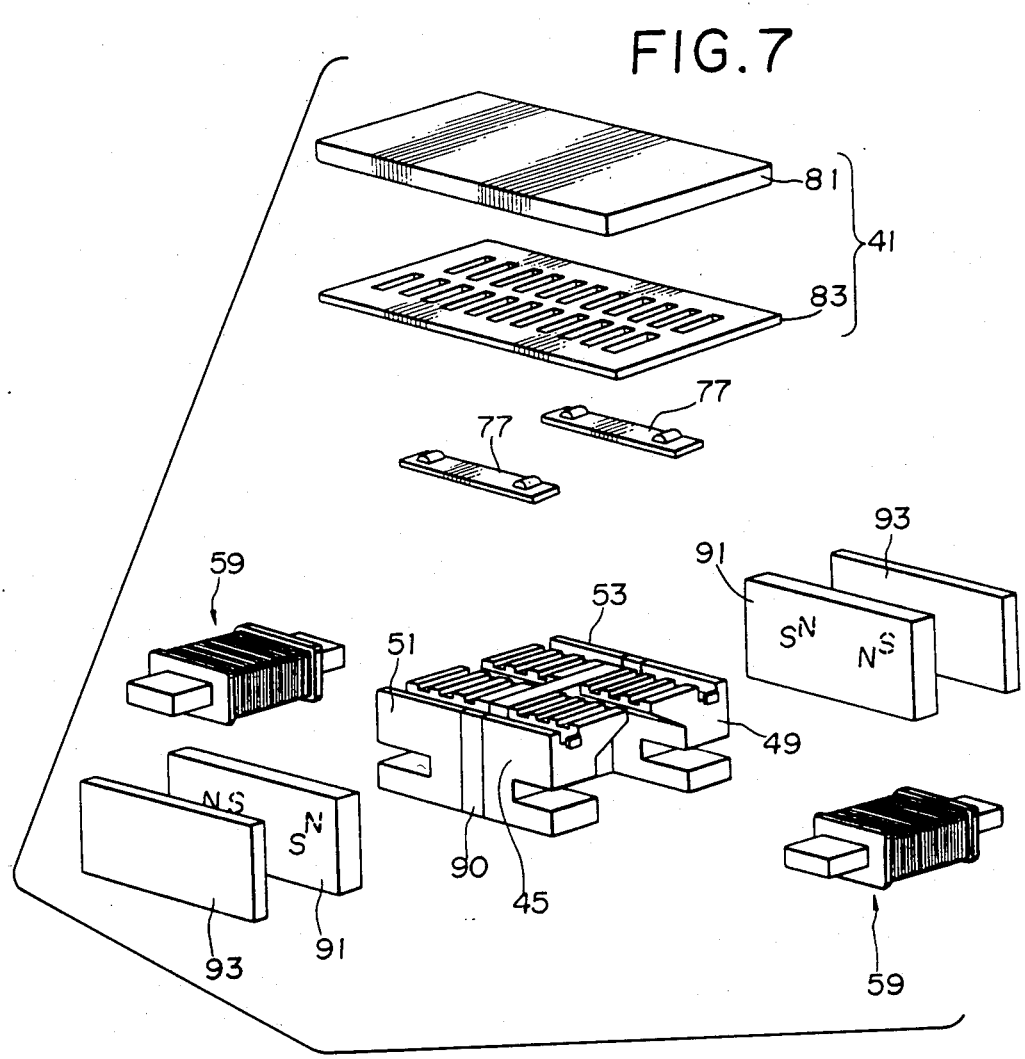
FIG. 7 is an exploded view of a modified form of the linear pulse motor in FIG. 6.

FIGS. 7 and 8 illustrate a modified form of the linear pulse motor which is distinct from the linear pulse motor in FIG. 6 in that the spacer 20 is made of nonmagnetic material instead of permanent magnet, and in that the yoke members 45 and 51 and 49 and 53 are magnetically coupled by a pair of rectilinear permanent magnets 91 and 91, respectively, each magnet 91 being bonded to outer lateral sides of corresponding yoke members. The magnets 91 have each a back plate 93 of magnetic material boned to the outer sides thereof.

What is claimed:

1. In a linear pulse motor which includes: a primary magnetic flux generating unit (27, 37) composed of a pair of cores (4, 5) each having a coil (2, 3) wound therearound and a plurality of magnetic poles (4a, 4b;

5a, 5b) provided at end portions thereof; and a scale (21; 31) having a row of first teeth (21A, 21B; 31A, 31B) formed therein along a direction of relative travel thereof with respect to the magnetic flux generating unit, the scale and the flux generating unit being disposed so that the scale moves relatively with respect to the primary magnetic flux generating unit by generating magnetic flux between gaps formed between the magnetic poles (4a, 4b; 5a, 5b) and the first teeth (21A, 21B; 31A, 31B) facing to the magnetic poles, the improvement wherein;

(a) the magnetic flux generating unit (27, 37) comprises a spacer (43, 90) through which the cores are jointed in a parallel manner;

(b) each core has a pair of parallel separate yokes (45, 49; 51, 53), each yoke having a magnetic pole (61, 63, 67, 71) at one end thereof, and a connecting member (55) magnetically coupled to the other end of each yoke of the core to give the core a substanially U shape, said connecting member having the coil wound therearound; and (c) the magnetic flux generating unit is disposed so that the cores are placed in one of a direction parallel to and a direction perpendicular to the row of first teeth (21A, 21B; 31A, 31B).

2. A linear pulse motor as recited in claim 1, wherein each core comprises means for interengaging each yokes (45, 49; 51, 53) to the connecting member (55), the interengaging means being disposed to other end portions of the yokes thereof and opposite end portions of the corresponding connecting member.

3. A linear pulse motor as recited in claim 2, wherein said interengaging means comprises a recessed portion (45C, 49C, 51C) formed at the other end portion of each yoke, and the opposite end portions of the corresponding connecting member, the opposite end portions engaging with the respective recessed portions.

4. A linear pulse motor as recited in claim 3, wherein said spacer (43) is made of a permanent magnet.

5. A linear pulse motor as recited in claim 1, 2 or 3, wherein said spacer (90) is made of a non-magnetic material, wherein the cores are disposed so that yokes of one core face to respective yokes of the other core through said spacer to form two pairs of facing yokes (45, 51; 49, 53), and wherein the magnetic flux generating unit comprises a pair of platelike permanent magnets (91, 91) attached to outside faces of respective facing yoke pairs so that the permanent magnets magnetically couples the respective facing yoke pairs.

* * * * *